United States Patent [19]
Deye et al.

[11] 3,729,582
[45] Apr. 24, 1973

[54] TRACKING SYSTEM TRACKER UNIT

[75] Inventors: Neil S. Deye; Richard B. Kuhn, both of Columbus, Ohio

[73] Assignee: North American Rockwell Corporation

[22] Filed: Jan. 18, 1967

[21] Appl. No.: 610,459

Related U.S. Application Data

[62] Division of Ser. No. 403,396, Oct. 12, 1964.

[52] U.S. Cl.........178/6.8, 250/203 CT, 178/DIG. 21
[51] Int. Cl..............................................H04n 3/00
[58] Field of Search........................178/6.8, DIG. 21; 250/203 CT

[56] References Cited

UNITED STATES PATENTS

| | | | |
|---|---|---|---|
| 2,764,698 | 9/1956 | Knight | 250/203 X |
| 2,970,187 | 1/1961 | Hinton | 178/6.8 |
| 3,320,360 | 5/1967 | Thompson | 178/6.8 |

*Primary Examiner*—Benjamin A. Borchelt
*Assistant Examiner*—S. C. Buczinski
*Attorney*—William R. Lane and Daniel H. Dunbar

[57] ABSTRACT

Apparatus and methods processing the video signal of a television camera sensor into a tracking error correction signal form used to control the viewing axis of the television camera sensor in tracking alignment with respect to a detected target. A pre-gate or post-gate extension, or both, is combined with the basic tracker unit tracking gate pulse to develop improved tracking control in directions at right angles to the television camera sensor direction of line scanning.

12 Claims, 13 Drawing Figures

Patented April 24, 1973
3,729,582
3 Sheets-Sheet 1
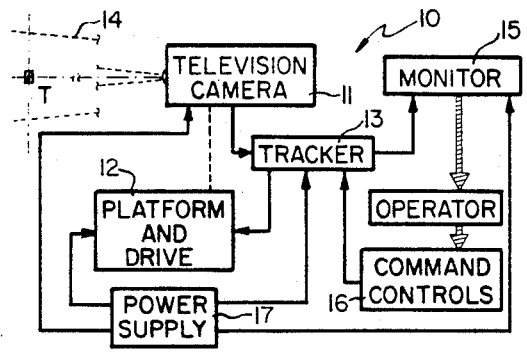
Fig. 1
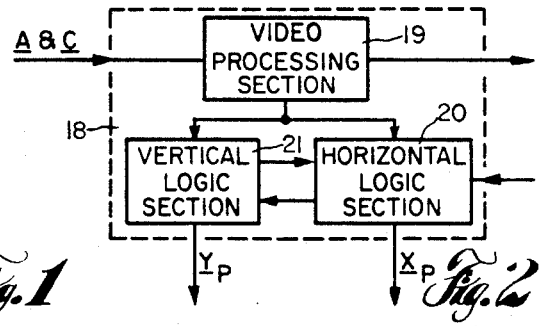
Fig. 2
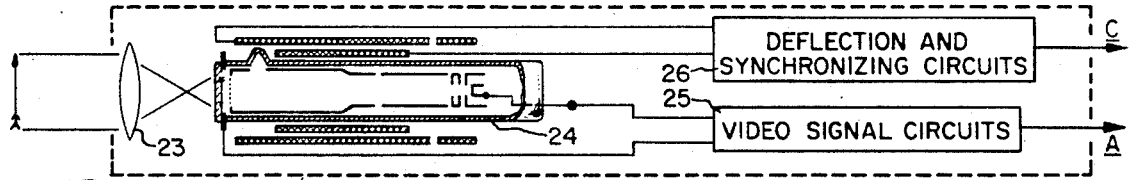
Fig. 4
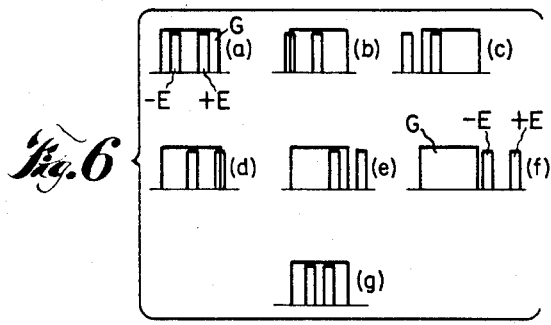
Fig. 6
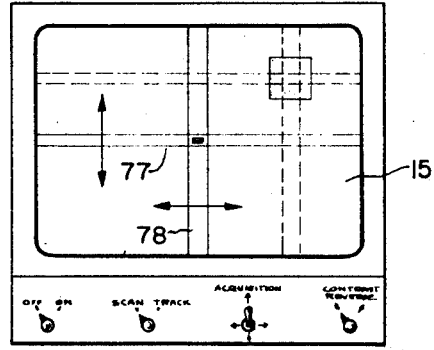
Fig. 3
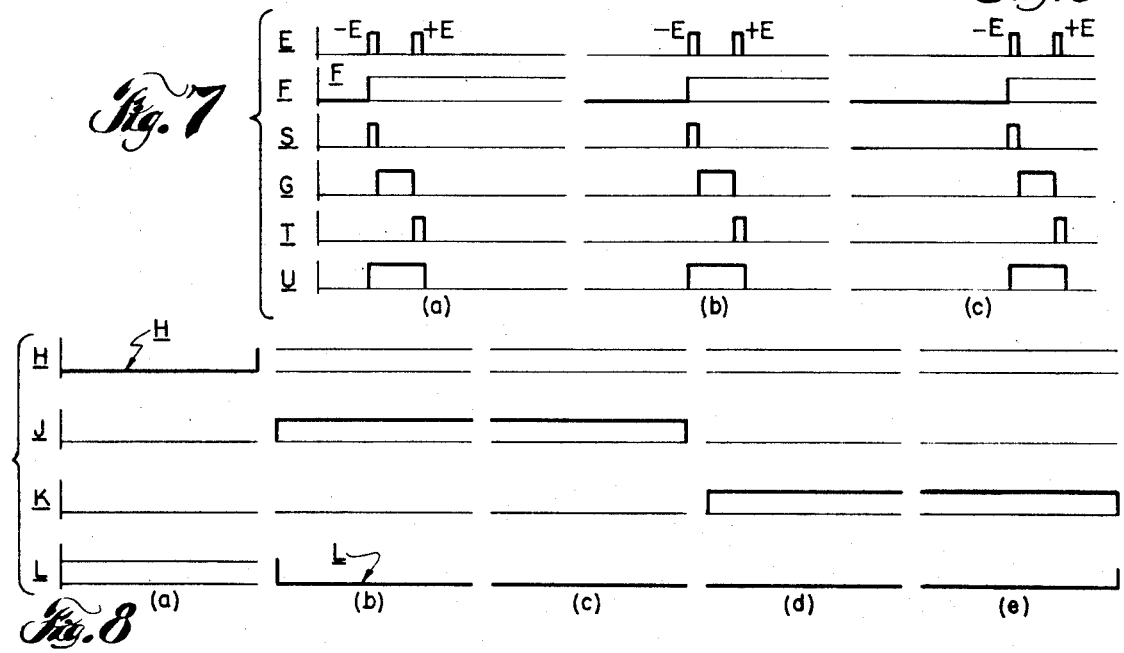
Fig. 7
Fig. 8

INVENTORS
NEIL S. DEYE
RICHARD B. KUHN

ATTORNEY

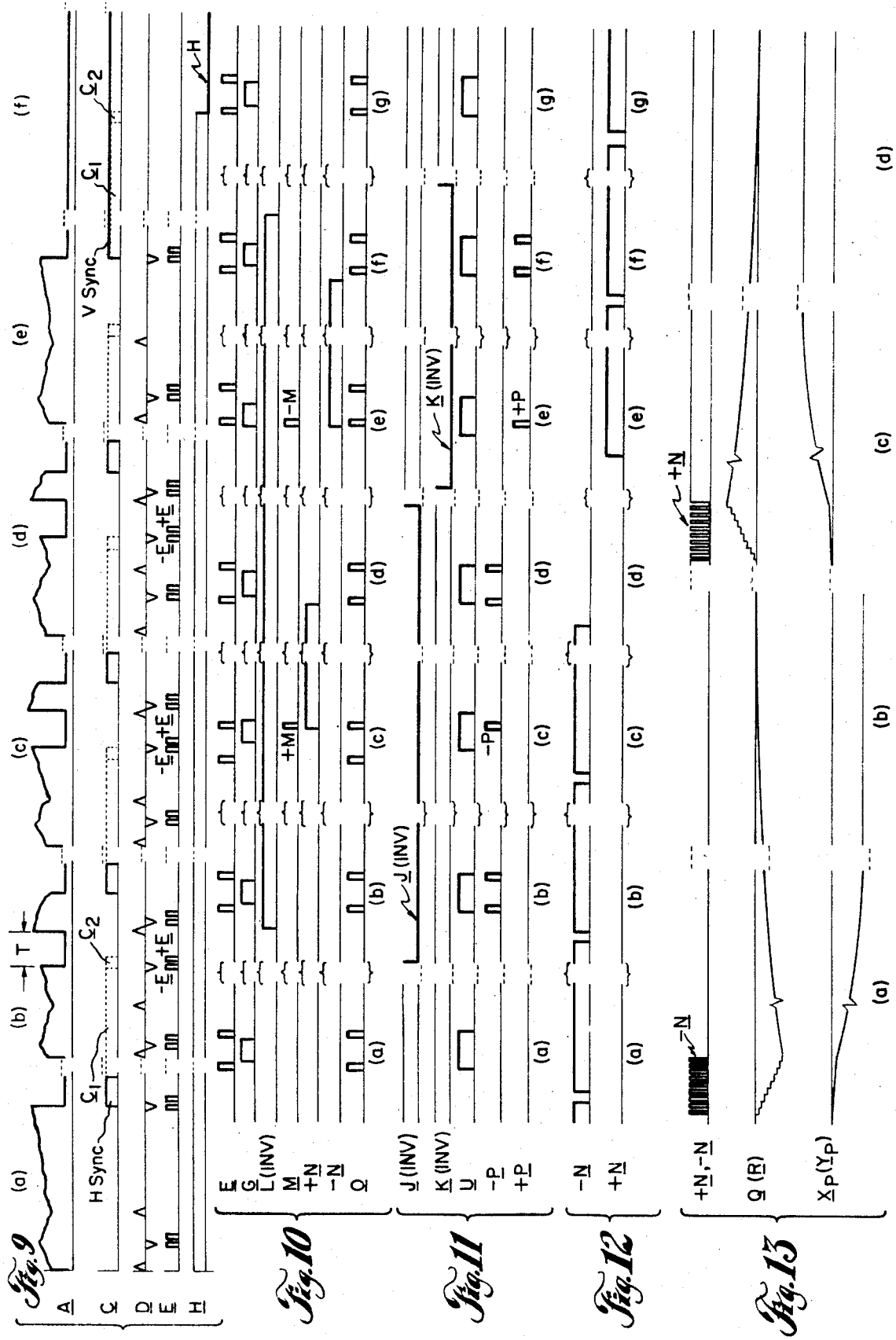

TRACKING SYSTEM TRACKER UNIT

CROSS-REFERENCE

This application is a Divisional application of copending application Ser. No. 403,396, filed Oct. 12, 1964.

SUMMARY OF THE INVENTION

The tracking system tracker unit of the instant invention is comprised of apparatus that develops tracking error correction signals for controlling the television camera sensor viewing axis in both azimuthal and elevational tracking alignment with a selected target indirectly through the tracker unit support platform. The desired azimuthal tracking error correction signal is derived from the coincidence of: elevational tracking, desired azimuthal alignment manifested by the time position of a comparatively narrow basic azimuthal tracking gate pulse, and detected target edge deviation from tracking alignment. The azimuthal tracking gate pulse is in effect driven away from any detected singularly coincident target edge and toward the target interior; support platform correction is correlated with respect thereto. The desired elevational tracking error correction signal is derived from the coincidence of: azimuthal tracking, desired elevational alignment manifested by the time position of an elevational tracking gate pulse, and detected target edge deviation from tracking alignment. The detected target edge that develops the coincidence relation for azimuthal tracking correction normally is positioned just outside or just into the basic tracking gate pulse during tracking alignment. In accordance with our invention, a pre-gate or post-gate extension (or both) is added to the azimuthal tracking gate pulse and is used to indicate azimuthal tracking when establishing coincidence for the elevational tracking error correction signal derivation. Such extension functions to significantly minimize or eliminate the likelihood of loss of target lock-on during automatic tracking by the tracking system tracker unit.

DRAWING DESCRIPTION

FIG. 1 is a functional block diagram of a tracking system of the type which may advantageously incorporate a tracker unit having the features of this invention;

FIG. 2 is a functional block diagram of the construction that is basic to the type of tracker unit to which this invention applies;

FIG. 3 is an elevational view of one suitable form of the monitor unit and the command controls unit shown as separate functional blocks in FIG. 1;

FIG. 4 is a combined sectional view and functional block diagram of one form of television camera unit that has been used with the embodiments of a tracker unit shown schematically in FIG. 5;

Figure 5:
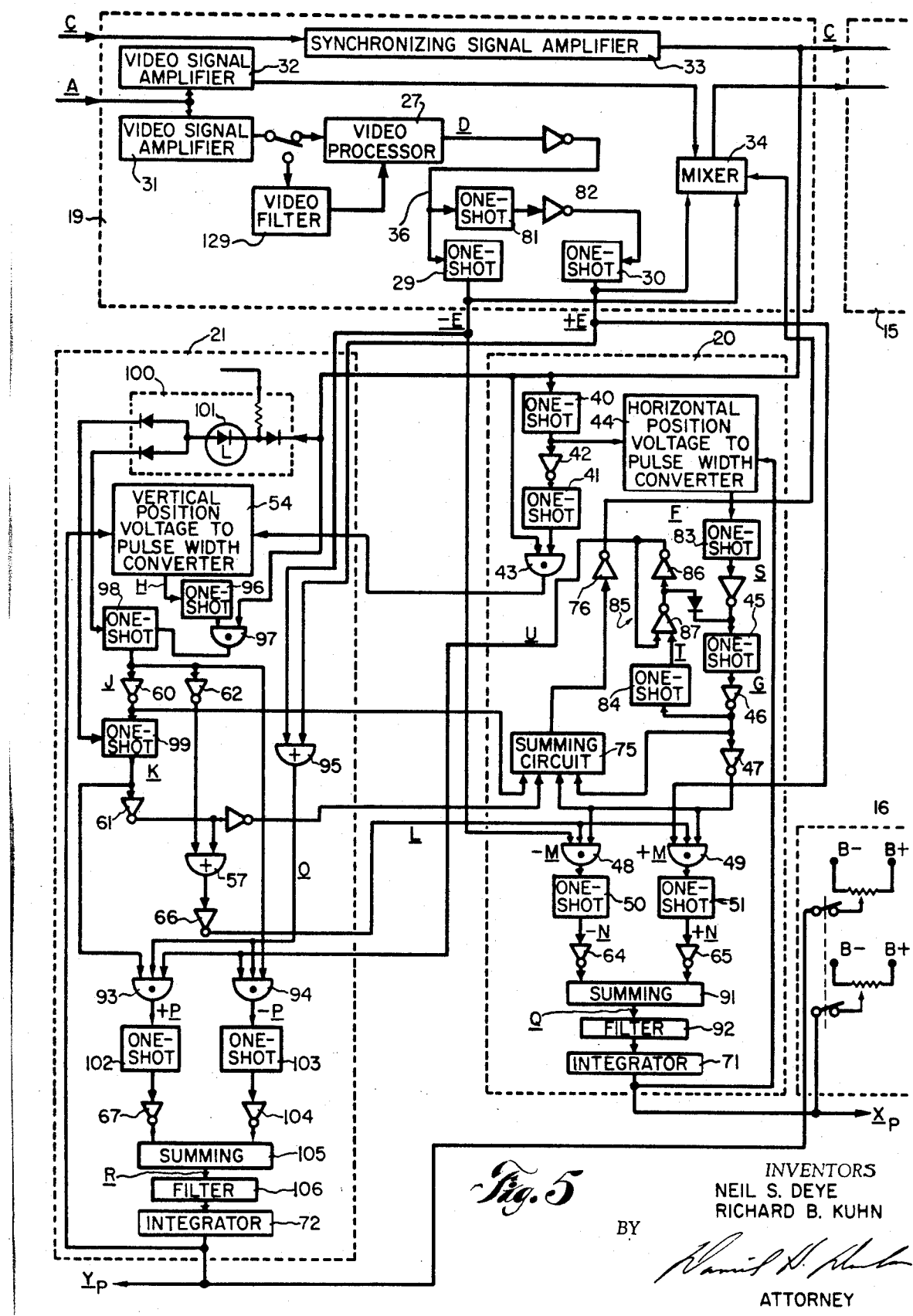
FIG. 5 is a schematic diagram of a tracker unit having a preferred embodiment of the apparatus of this invention incorporated therein.

FIG. 6 details various coincidence relations that do or may exist between edge marker pulses of a selected target and the basic horizontal tracking gate pulse utilized in the FIG. 5 tracker unit embodiment;

FIGS. 7 through 13 detail key waveforms that appear at noted points within the tracker unit shown in FIG. 5 during tracking system automatic tracking operation.

DETAILED DESCRIPTION

The type of tracking system which this invention is broadly concerned with is illustrated generally by the functional block diagram of FIG. 1. Such tracking system is referenced as 10 and is basically comprised of an optical sensor in the form of television camera unit 11, a platform and drive unit 12, and a tracker unit 13. The platform portion of unit 12 serves to support television camera 11; during operation of system 10 in its automatic tracking mode the drive portion of unit 12 serves to move the platform and connected camera unit 11 in tracking relation to the relatively movable target T positioned within the field of view designated 14. Tracker unit 13 regulates tracking movement of platform and drive unit 12 and couples that unit to television camera 11 in a feedback control relation. In addition, system 10 includes a monitor unit 15 which takes the form of a typical monochrome television picture tube and which is used to present a visual display of the general tracking problem viewed by the optical sensor and an indication of system tracking alignment. A human operator provides the link which exists between monitor unit 15 and the command controls function designated 16. The operator is normally responsible for accomplishing such command functions as activating the system, selecting the system mode of operation (scanning or automatic tracking), selecting the target if choice is involved, and obtaining acquisition of the selected target in the system tracking reticle prior to locking-on for automatic system tracking. A power supply 17 of conventional form is typically included in system 10 to provide the preferred electrical energy for system operation.

FIG. 4 is included in the drawings to provide a schematic illustration of a type of television camera unit that has been utilized in a tracking system 10 which incorporated a tracker unit having the features of this invention. Such television camera unit is referenced generally as 22 and is basically comprised of a lens system 23, a camera tube 24, conventional video signal circuits 25, and conventional deflection and synchronizing circuits 26. For the purpose of this invention a specific form of television camera tube is not necessary; however, a vidicon-type camera tube such as is shown as component 24 of FIG. 4 has been utilized as the optical sensor portion of a tracking system having an actual embodiment of this invention. The specific vidicon-type camera tube 24 had a signal electrode photoconductive layer with a ⅜" × ½" format. The video signal circuits 25 and the deflection and synchronizing circuits 26 associated with the actually used unit 22 operated to produce a standard 1-volt television camera output video signal (A) and a composite horizontal and vertical synchronization signal (C) with a field repetition rate of 60 cycles per second. Since closed-loop circuits are normally used, it is not required that signals A and C be combined for transmission. Such signals, as used, did produce a standard raster comprised of 525 lines; interlacing of separate field frames can be used but is entirely optional insofar as the hereinafter-claimed invention is concerned. In addition, the video signal A of the actually used FIG. 4 arrangement included blanking pulses in correlated relation to the signal C horizontal and vertical synchronization information. Equalization pulses associated with the conventional horizontal and vertical synchronization signal produced by circuits 26 are not necessary to operation of the tracking system; also it is generally preferred that the vertical synchronization pulses contained within signal C be non-serrated.

FIG. 2 illustrates the functional block construction of a tracker unit which is designated 18 and which may have any one of the several specific embodiments detailed in the drawings and in the following description; such construction may be advantageously utilized as the tracker unit for tracking system of the type disclosed generally by FIG. 1. Tracker unit 18 is essentially comprised of a video processing section 19, a horizontal logic section 20, and a vertical logic section 21. Basically, tracker unit 18 receives the output signals of television camera unit 11 (e.g., signals A and C of the FIG. 4 means) and by preferred apparatus (circuit means) and information processing methods derives two output signals that may conveniently be used to control azimuthal and elevational movement of unit 12 (and camera 11) during the automatic tracking mode of system operation. One such output signal ($X_p$) is basically produced by horizontal logic section 20 and is an error correction signal for automatic tracking in an azimuth sense; the other output signal ($Y_p$) is basically produced by vertical logic section 21 and is an error correction signal for automatic tracking in an elevation sense. Particular schematic arrangements which are used to comprise the hereinafter described preferred embodiments of tracker unit 18 are disclosed in connection with FIG. 5 of the drawings.

Several general comments are desirable with respect to the tracker unit details in the drawings. First, most of the included circuits (e.g., video signal amplifiers 31, 32, synchronizing signal amplifier 33, mixer 34, and the like) are or can be conventional in both function and construction and are sufficiently well known so that a functional block description is adequate for disclosure purposes; details regarding their construction are not shown in the drawings. Those circuits which are fundamental to operation of the tracker unit described herein and which generally are not clearly understood by a functional description alone are further detailed as to a suitable specific form in the above-referenced co-pending U.S. Pat. application Ser. No. 403,396. In considering the following description it should also be kept in mind that the disclosed embodiment of a tracker unit is basically a digital-type system that processes information in pulse form; the video signal inputs to, and the tracking error correction signal outputs from, the tracker units, however, are essentially analog in form. Generally, and unless otherwise noted, it is preferred for uniformity purposes that the various disclosed pulse circuits be triggered and fired by detected positive changes in the voltage shape of a received pulse. Accordingly, it often is necessary to employ various inverter circuits (e.g., the inverter circuit 46 of FIG. 5) to key triggering actions to the leading edge of negative pulses or the trailing edge of positive pulses. Frequent reference is made in the drawings to a circuit identified as a "one-shot" (e.g., circuit 29, 45, etc.). Such circuit is better described technically as a monostable multivibrator circuit. In those instances where the monostable multivibrator circuit employed requires a particular operating duration characteristic, such is indicated in the description. Generally speaking, the basic coupling of individual circuits to a power supply (B+ or B−) or to a necessary ground or reference value voltage is well-understood and is not always shown; similarly usable signal levels are not specified herein. The tracker unit embodiment of the drawings is described in operating relation to a television camera video signal wherein increasing signal voltages are caused by increasing image brightness; by polarity reversal techniques the tracker unit can be made to operate equally well using or receiving a television video signal based on a negative transmission method.

Also, unless otherwise noted, the following description refers to negative and positive voltage values and such polarities have meaning with respect to a basic viewing reference. Targets positioned at the center of the system tracking reticle (and also at the center of the monitor of video signal raster) require zero tracking correction and produce zero position voltages and zero value correction signals. Targets viewed in or moved to the raster left or top portions establish positive voltage signals of proportionally increasing value to indicate position location or tracking correction. Conversely, targets viewed in or moved to the raster right or bottom portions are tracked using comparatively negative voltage values to indicate position or nature of correction required. Such polarities are particularly important with respect to the output $X_p$ and $Y_p$ signals of the tracker unit.

Referring to the embodiment of tracker unit 18 shown in FIG. 5, the basic function of forming marker pulses associated with a detected target edge deviation from tracking alignment is accomplished by video processor circuit 27 and by one-shots 29 and 30 therein. One-shot 81 (and cooperating inventer 82) function to establish the delay required for a highly desired "false trailing edge" marker pulse for each detected change in the selected class of contrast changes detected by circuit 27. Such false trailing edge pulse is formed by one-shot 30 and is important from a standpoint of system performance in situations where the target edge separation otherwise is great with respect to the basic tracking gate pulse duration. The signals A and C that are received from television camera unit 11 may e amplified, as by the adjunct amplifier circuits 31, 32, and 33. In addition, a mixer circuit 34 may be incorporated in video processing section 19 for use in developing information to be utilized in monitor unit 15 to display an indication of tracking system tracking alignment. The basic output signals of video processing section 19 are constant marker pulse signals designated +E and −E. Normally, −E marker pulses are associated with decreasing video signal voltages including the leading edge (FIG. 9) of a selected comparatively dark target.

Basically, video processor circuit 27 receives an amplifier video signal A and by differentiating operations detects all increases or decreases in signal voltage which occur within each horizontal line of camera field-of-view scan. By use of a suitably selected circuit time constant value, circuit 27 is made to provide positive and negative edge pulses D (FIG. 9) corresponding respectively to increases and decreases detected in the voltage of video signal A. A suitable transistorized circuit for accomplishing the differentiating function is shown in FIG. 10 of the above-identified co-pending parent application. Those edge pulses which designate decreasing voltage slopes (FIG. 9) are conducted by channel 36 after inversion to one-shot circuit 29 where a squaring and stretching function is accomplished. Similarly, those edge pulses also trigger one-shot 81 whose output, after inversion by element 82, initiates one-shot circuit 30 to in effect accomplish a similar squaring and stretching function. In an actual embodiment of the tracker unit of FIG. 5 it was found desirable that the pulse durations obtained by one-shots 29 and 30 should be approximately 1/10 to 1/5 of the video signal horizontal scan time duration that indicates the minimum image of the selected target projected on the photoconductive layer format of camera tube 24 during automatic system tracking; the output pulse durations that were actually developed were each 0.3 microseconds. In selecting the individual components for one-shot circuit 81, it is preferred that the circuit output signal have a time duration just a little longer than the duration of the basic horizontal tracking gate pulse developed by one-shot circuit 45; thus, in the actual embodiment of the FIG. 5 tracker unit arrangement, one-shot circuit 81 was provided with a 1.5 microsecond width in relation to a 1.0 microsecond basic horizontal tracking gate pulse width. The output pulse signals of one-shots 29 and 30 are designated as −E and +E, respectively, in the remaining portion of this description. Such one-shot output signals are hereinafter frequently referred to as marker pulses and are the previously referenced basic output signal pulses of video processor section 18.

It is required that the operation of horizontal and vertical logic sections 20 and 21 be synchronized with the tracking problem information sensed optically by camera unit 11 and transmitted in video signal A. For this reason, tracker unit 18 of FIG. 5 is provided with a synchronization circuit that in one form is essentially comprised of one-shot circuits 40 and 41, intermediate pulse inverter circuit 42, and AND gate circuit 43. Such synchronization circuit is located in section 20 of the FIG. 5 arrangement only as a matter of convenience. One-shot circuit 40 is triggered by the leading edge of each synchronization pulse comprising composite signal C and produces a positive pulse output signal $C_1$ having a time duration that is at least greater than the pulse width of any horizontal synchronization pulse in composite signal C but that is appreciably less than the time duration of one video signal scan-line. In an actual embodiment of the FIG. 5 arrangement, a time duration of approximately one-half scan-line (e.g., 30 microseconds) has been found suitable for output pulse signal $C_1$. Such signal $C_1$ is inverted by circuit 42 so that the decreasing voltage trailing edge of $C_1$ in effect triggers one-shot circuit 41 to thereby cause circuit 41 to create a pulse signal $C_2$ that serves a triggering function and that exists only during the absence of a horizontal synchronization pulse. A comparatively short time duration (e.g., 2 microseconds) for such output pulse signal $C_2$ has proven adequate for at least one known tracker unit application. AND gate circuit 43 receives all pulses of composite synchronization signal C and also all trigger pulse signals $C_2$ from one-shot circuit 41. Such trigger pulse $C_2$ is gated through AND gate 43 only when it is time coincident with a vertical synchronization pulse. See FIG. 9. The trigger pulse gated through AND gate circuit 43 also is referenced as signal $C_2$. It should be noted that signal $C_2$ is synchronized with the vertical synchronizing pulse but has a slight time lag with respect to its leading edge; such delay is not at all detrimental to the operation of vertical logic section 21.

A basic horizontal (azimuthal) tracking gate pulse signal G (FIG. 7) having a controlled time position in each raster scanline is developed in horizontal logic section 20 essentially by means of controllable monostable multivibrator circuit 44 and one-shot circuit 45. Details of a suitable construction for circuit 44, also referred to as a horizontal position voltage to pulse width converter circuit, are provided in the drawings and description of previously identified application Ser. No. 403,396. Such circuit is essentially a time delay circuit that is triggered by a positive-going voltage change in the leading edge of each pulse $C_1$ generated by one-shot circuit 40; such leading edges also correspond to the leading edges of the horizontal synchronization pulses in signal C. The output signal F of circuit 44 is a negative-going pulse whose time duration from start is proportional to the magnitude of feedback analogue voltage signal $X_p$ which is developed by section 20 as a whole. One-shot circuit 45 develops a positive output pulse G which has a short time duration and which is the hereinbefore referred to basic horizontal tracking gate pulse. Inverter circuits 46 and 47, which circuits may comprise a dual inverter circuit module, are utilized in part to condition horizontal tracking gate pulse G for use in other portions of horizontal logic section 20.

Horizontal logic section 20 in the FIG. 5 arrangement also develops a concurrence gate pulse for use in vertical logic section 21, such gate pulse (U) being a time-extended version of the basic horizontal tracking gate pulse G. The components for accomplishing the difference in construction are essentially one-shot circuit 83, one-shot circuit 84, and the flip-flop circuit 85 comprised of cooperating inverter circuits 86 and 87. In normal inverter applications the two input terminals of each section to a typical dual inverter circuit module are joined together; in flip-flop current applications, however, the input terminals remain separate.

One-shot circuits 83 and 84 each provide an extension at one side of the basic horizontal tracking gate pulse G. The output pulse S of one-shot circuit 83, is of comparatively short duration and leads basic horizontal tracking gate pulse G; in inverted form the trailing edge of signal S triggers one-shot circuit 45. See FIG. 7. The basic horizontal tracking gate pulse G is inverted by circuit 46 and its trailing edge triggers one-shot circuit 84 to produce output pulse T. Pulse T is also of comparatively short duration and trails the trailing edge of pulse G. In one embodiment of the detailed tracker unit, and in the case of pulse S, pulse T provided an 0.5 microsecond extension to the adjacent edge of basic horizontal tracking gate pulse G. By means of flip-flop circuit 85, a positive-going extended horizontal gate pulse U is developed from S, G, and T signal pulse components for vertical logic section 21. The flip-flop circuit is utilized rather than an AND gate so as to eliminate any discontinuity which otherwise would or could appear in the composite extended horizontal gate pulse.

The detection of a horizontal tracking alignment error is accomplished essentially by paired but independent AND gates 48 and 49. Details regarding a typical satisfactory construction for the AND gates used in the invention are provided in said co-pending application Ser. No. 403,396. AND gates 48 and 49 each utilize three input terminals. In each instance, one of the input terminals receives the positive-going horizontal tracking gate pulse signal G originated in one-shot circuit 45 as fully inverted and re-inverted by circuits 46 and 47. Another input terminal of each such AND gate receives pulse signal L developed within vertical logic section 21 and correlated to vertical tracking concurrence. AND gate circuit 48, in the arrangement of FIG. 5, also receives all −E edge marker pulse signals produced by one-shot 29 of video processor section 19; similarly, AND gate 49 is arranged to receive all of the +E edge marker pulse signals developed by one-shot circuit 30 of video processor section 19. AND gate circuits 48 and 49 each function to pass the −E and +E edge marker pulse signals through to trigger or fire one-shot circuits 50 and 51, respectively, whenever signals G and L are time-coincident therewith. A separate waveform designation M is assigned to the passed signals resulting from the detected time-coincidence. Such signals, which are basically tracking error detection signals, in turn are preferably extended time-wise by one-shot circuits 50 and 51 to just less than one scan-line period in duration (e.g., 60 microseconds) to form the basic horizontal tracking error pulse signals N developed within tracker unit 18; such signals exist in either a −N or +N category although each would have an identical positive-going polarity form. One-shot circuits 50 and 51 are similar to circuit 30 but must each be provided with a fast-recovery capability (e.g., 0.5 microseconds).

Tracker unit 18 also detects vertical tracking errors and develops related correction signals, such being accomplished essentially within vertical logic section 21. However, the apparatus and information processing methods utilized in section 21 differ somewhat in construction and function from the comparable aspects of horizontal logic section 20. The differences essentially relate to use of a different form of tracking gate; also, position information concerning the detected target is derived from horizontal logic section 20 signals rather than from video processor section 19.

Vertical tracking gate pulse signals having a controlled vertical position within the vertical extent of the complete raster produced by television camera unit 11 are developed in vertical logic section 21 essentially by means of controllable monostable multivibrator circuit 54 and one-shot circuits 98 and 99. Circuit 54 is also referred to as a vertical position voltage to pulse width converter circuit; it is a time delay circuit that is triggered by a positive-going voltage change in the leading edge of each pulse $C_2$ passed through AND gate circuit 43. Such leading edge identifies the existence of a vertical synchronization pulse within composite signal C. The output signal H of circuit 54 is a negative-going pulse whose time duration from start is proportional to the voltage of signal $Y_p$ developed by section 21 as a measure of required vertical tracking error correction for the system. Output pulse H has a positive-going trailing edge that fires one-shot circuit 96 only. One-shot circuit 98 develops a positive output pulse J having a time duration that constitutes one portion of the basic vertical tracking gate of tracker unit 18. Signal J in one actual embodiment of the invention was provided with a time duration of approximately 400 microseconds or 6 video signal scan-line periods; stated in another manner, signal J in time duration was preferably in the range of 1/60 to 1/125 of the duration of the video signal A field repetition frequency. The pulse signal J output of one-shot circuit 98 is inverted by inverter circuit means 60 so that its trailing edge in effect triggers one-shot circuit 99. The output signal K of circuit 99 preferably has a form and duration corresponding to the form and duration of signal J produced by one-shot circuit 98. Output pulse signal K then constitutes the remaining portion of the basic vertical (elevational) tracking gate of tracker unit 18. Signals J and K are in effect combined by OR gate 57 and form the basic vertical tracking concurrence pulse signal L that is required in horizontal logic section 20 on a coincidence basis to gate −E and +E contrast marker pulses through gates 48 and 49. Inverter circuits 61 and 62, like circuit 60, are provided in section 21 to develop the proper polarity for the indicated pulses at the indicated stages of signal processing. In this respect, it should be noted that OR gate 57 functions to gate negative pulses; the output of that gate in turn must be inverted, as by inverter circuit 66, to place the vertical tracking gate pulse in proper polarity condition for gates 48 and 49.

In vertical logic section 21 the real and false E contrast marker pulses developed in video processing section 19 are coincidence gated by paired out independent vertical tracking gates 93 and 94. Such gating occurs with concurrent extended horizontal tracking gate U and the separate vertical tracking gate portions J and K.

Vertical logic section 21 of the FIG. 5 embodiment also includes construction features which serve to stabilize the leading edge portions of the vertical tracking gate pulses J and K at the raster margin. Basically, the controllable monostable multivibrator circuit designated 54 triggers an intermediate one-shot circuit 96 having a duration of at least one scan-line. The output pulse of circuit 96 AND gates (at AND gate 97) each coincident pulse of synchronization signal C received from synchronizing signal amplifier 33. Thus, one-shot circuit 98 produces an initial vertical tracking gate pulse J that assuredly is started at the raster left margin in every instance. One-shot circuit 99 develops a positive-going vertical gate pulse K in response to the triggering action of the trailing edge of inverted pulse J sourced in circuit 98. One-shot circuits 98 and 99 are generally similar to previously described one-shot circuits except that a controllable monostable multivibrator construction is employed. Such are triggered by pulses received from AND gate 97 or inverter circuit 60 but are controlled by synchronization circuit 100 to assure that the produced gate pulse is stopped at a scan-line end. Component 101 of synchronization circuit 100 is a Zener-type diode. One-shot circuits 102 and 103 are provided in section 21 to give essentially one-line duration to the coincidence-passed real and false contrast marker pulses E gated through AND gates 93 and 94. Inverter circuits 67 and 104 are included to develop the proper pulse polarity for summing circuit 105. Summing circuit 105 and filter circuit 106 are preferably of the same construction associated with circuits 91 and 92.

The detection of a vertical tracking alignment error is accomplished in vertical logic section 21 essentially by paired but independent AND gates 93 and 94. As in the case of AND gates 48 and 49, such vertical section gates may use the construction detailed in our co-pending parent application. In each instance, one of the input terminals receives a signal O from OR gate 95; such signal is essentially made up of −E or +E edge marker pulses. Another input terminal of AND gate 93 receives the vertical tracking gate signal K developed within one-shot circuit 99. AND gate 94, on the other hand, receives the J pulse signal portion of the basic vertical tracking gate as produced by one-shot 98. The third terminal of each such gate (93 or 94) receives the time-extended horizontal tracking gate pulse U to establish concurrence with horizontal or azimuthal tracking. A separate waveform designation P is assigned to the passed pulse signals resulting from the time-coincidence of a detected target edge manifested by a marker pulse, a vertical tracking gate pulse, and a pulse indicating concurrence with horizontal tracking. Those passed signals (tracking error detection signals) which are associated with the gating action of one-shot circuit 98 only are given a −P designation; those vertical tracking error detection signals which are developed through time-coincidence with the vertical tracking gate pulse established by one-shot circuit 99 are designated as +P. Time-wise in each raster, +P pulses will normally occur after the developed −P pulses.

The remaining portions of logic section 20 and 21 comprise a summing circuit 91 (or 105), a filter circuit 92 (or 106), and an integrator circuit 71 (or 72) as shown in FIG. 5. Such additional circuits essentially function to develop appropriate tracking error correction signals ($X_p$ or $Y_p$) for controlling movement of the tracking system sensor in tracking relation to moving or movable target T. Such tracking error signals, which are basically in DC voltage analog form, also are provided as feedback signal inputs to controllable monostable multivibrator circuits 44 and 54. Detailed construction of particular circuits for accomplishing the functions of circuits 91, 92, and 71 are provided in the referenced co-pending parent application.

Summing circuit 91 functions to add the inverted −N and +N tracking error pulses which appear at any instant within horizontal logic section 20 during operation of the tracker unit. The output signal of cumming circuit 91 is designated Q; in the case of circuit 105, the output signal is identified by the reference letter R. During precise tracking alignment the difference of −N and +N signals seen by circuits 92 and 71 is essentially zero. However, in either case when there is tracking misalignment a sequence of −N or +N pulses are present in the raster makeup and does cause error correction signals to be developed in the subsequent portion of the tracker unit. (See FIGS. 10 and 13 for specific examples.) In the case of summing circuit 105, and because of the use of sequenced gates J and K, the input tracking error signals −P and inverted +P are entirely non-coincident. Filter circuits 92 and 106 are provided in the invention so as to essentially average out or smooth the pulsed output signals Q and R so as to be in usable form for integrator circuits 71 and 72. Circuits 92 and 102 are substantially identical in function but differ in that filter circuit 106 must essentially respond to R signals which normally occur in sequential groupings. Up to six successive individual pulses may comprise each such grouping in the case of specific one-shot circuits 98 and 99 each having a 400 microsecond output. Integrator circuits 71 and 72 respond essentially to the output of circuits 91 and 105; their outputs are inverted relative to the polarity of the inputs to the summing circuits 91 and 105. See FIGS. 11 and 12.

The television picture tube element normally included in monitor unit 15 basically receives video signal A and synchronization signal C for developing a conventional visual presentation of the general tracking problem to be observed by the system operator. The visual display presented thereby, however, may be significantly enhanced by other features of this invention. Such enhancement is accomplished by means of summing circuit 75 and by means of the −E and +E edge marker pulse signals developed in circuits 29 and 30. Summing circuit 75 develops so-called cross-hair pulse information for presentation on the screen of monitor unit 15. Such cross-hair pulse information develops the paired horizontal cross-hair lines 77 and the paired vertical cross-hair lines 78 shown in FIG. 3. The rectangular area defined by and located within the intersection of cross-hair lines 77 and 78 comprise the tracker unit 18 reticle. The cross-hair pulse information is developed in circuit 75 essentially by differentiator sub-circuits that detect negative-going voltage changes in the leading and trailing edges of the appropriate gate pulses. More specifically, one input terminal of circuit 75 receives signal G after a single inversion and detects its leading edge; another input terminal of circuit 75 receives pulse G after a double inversion by circuits 46 and 47 and detects its negative-going trailing edge. Such detected edges comprise, after inversion and mixing, the cross-hair pulses that form dark cross-hair lines 78. In a similar manner, signals J (after inversion by circuit 60) and K are conducted to summing circuit 75 where their leading and trailing edges, respectively, are detected. The differentiated detected leading and trailing edges of the vertical gate pulses are afterwards introduced into monitor unit 15 to comprise horizontal cross-hairs 77.

This display developed for monitor unit 15 may also be enhanced by appropriate use of edge marker pulses −E and +E as follows. Mixer circuit 34 can function to gate those edge (contrast change) marker pulses which are time-coincident with tracking gate edge pulses developed in summing circuit 75 and amplify such passed pulses for presentation in the picture tube of monitor unit 15. The so-gated and so-amplified marker pulses give a display indication to the operator that tracker unit 18 is actually following the selected and displayed target contained within video signal A.

FIG. 6 illustrates various coincidence relations that exist as between edge marker pulses associated with a selected target and the basic horizontal tracking gate pulse G. In an earlier embodiment of tracker unit 13 the −E and +E edge marker pulses associated with the leading and trailing edges of a selected target were positioned entirely with the horizontal tracking gate pulse as shown in FIG. 16(a). Although the tracker unit embodiment of FIG. 5 preferably utilizes a pulse relationship wherein the separation between real and "false" marker pulses for a selected target is slightly greater than (or just equal to) the basic tracking gate pulse duration, the subsequent illustrations of 16(b) through 16(g) are equally helpful from the standpoint of understanding the significance of a non-singularly coincident pulse relationship. If the target is moved to the left relative to the viewing axis of the system optical sensor, the −E leading edge pulse will become coincident with the leading edge of the horizontal tracking gate pulse (FIG. 16(b)). Inasmuch as coincidence is still maintained as between the tracking gate pulse and both target edge marker pulses, no tracking alignment error is detected. Absence of a target edge marker pulse from within the tracking gate (FIG. 16(c)) causes development of a tracking error signal based on the singular coincidence of the remaining interiorly positioned target trailing edge marker pulse. Such error correction signal, as processed through summing circuit 91, filter circuit 92, and integrator circuit 71, in effect causes the horizontal gate to be repelled away from the coincident target edge marker pulse and toward the "escaped" target opposite edge (target interior). Relative movement between the target and the horizontal tracking gate in an opposite direction will cause tracking gate conditions corresponding to the relations shown in FIGS. 16(d) and 16(e). Sufficient rightward movement of the target will ultimately result in only the target leading edge being singularly coincident with the horizontal tracking gate pulse so as to cause an error signal indicating a need for tracking correction. See FIG. 16(e). FIG. 16(f) illustrates the situation which occurs when the selected target in effect outruns the established horizontal tracking gate. This situation is commonly referred to as an "unlock" situation; it occurs whenever the relative movement between the selected target and the optical sensor occurs at a rate that exceeds the maximum obtainable tracker unit tracking rate. FIG. 16(g) illustrates the minimum target edge marker pulse separation which generally may be permitted with respect to the tracker units described herein. The improved tracking rates which are obtained result chiefly from those situations wherein the distance between the target edges (edge marker pulses leading edges) is not less than one-tenth the duration of the horizontal tracking gate. As suggested above, the unit of FIG. 5 has successfully utilized separations wherein real and "false" edge marker pulses separated by 1.5 microseconds function with a 1.0 microsecond gate pulse G.

FIG. 7 illustrates the effect of the logic section output signal $X_p$ on the positioning of the horizontal tracking gate pulse within each video scan-line. The first and third line portions indicate situations wherein the gate pulse has been in effect moved significantly to the left or significantly to the right relative to the television picture tube raster centerlines. In the case of the first line portion (a) of FIG. 7, a large $+X_p$ signal will move marker pulse G leftward a proportional degree. The second line portion (b) of FIG. 7 shows the positioning of the gate pulse G at the horizontal center of the television picture tube raster essentially by means of delay signal F produced by a zero feedback input voltage. The zero feedback voltage is used to reference operation of the tracker unit to the center of the television raster. FIG. 7(c) illustrates a situation wherein a high negative voltage horizontal tracking error correction signal is utilized to move the horizontal tracking gate G toward the extreme right portion of the television camera raster. FIG. 7 also illustrates the relationships which exist between the basic azimuthal tracking gate pulse G, pulse extensions S and T, and the composite pulse U utilized to identify concurrent azimuthal tracking for vertical logic section 21.

FIG. 8 illustrates the relations which exist as between concurrence signal L indicating vertical tracking position and the variably positioned and sequentially fired gate pulses J and K that make up signal L. It should be noted that the leading edge of gate pulse J is coincident with the trailing edge of variable duration positioning pulse H. Similarly, the leading edge of gate pulse K is coincident with the trailing edge of gate pulse J. Pulse signal L is the inverted composite of pulses J and K and is conducted to horizontal logic section 20 for use in gating edge marker pulses that are coincident therewith and with the basic horizontal tracking gate pulse. As previously commented, the trailing edge of pulse signal H is positioned time-wise from the start of each vertical scan in proportion to the magnitude of the $+Y_p$ or $-Y_p$ error correction signal that is the output of vertical logic section 21. In the arrangements shown in the drawings, if the $Y_p$ signal is of zero voltage value, the trailing edge of pulse H is normally positioned just slightly above the vertical center of the raster.

FIG. 9 illustrates the various signals which occur within video processor section 19 and the synchronization circuit included as a matter of convenience within horizontal logic section 20. The signals of the first line within FIG. 9 detail typical positive transmission video signals produced by camera unit 11 during scanning of a general tracking problem. The first (a) and second-last (e) line portions of signal A in FIG. 9 show a representative background situation; the second (b) through fourth (d) line portions show the effect of a dark target T positioned against a comparatively light background. The last line portion (f) shows the presence of a vertical blanking pulse; horizontal blanking pulses occur in each of the other line portions at the trailing region. The horizontal and vertical synchronizing pulses produced by television camera unit 11 appear on the line designated C. Also superimposed on that line are the pulses $C_1$ and $C_2$ used to logically determine the existence of a vertical synchronization pulse in the composite synchronization signal. The last line of FIG. 9 shows the waveform H which occurs as the result of detecting a vertical synchronizing pulse in the composite synchronizing signal. Marker pulses detecting each contrast change occurring within a scan-line are designated D. By appropriate manual or automatic sensitivity control, the number and degree of contrast change detected within a typical scan-line may be varied. A variable amplification function carried out within video amplifier section 31 may be adequate for this purpose. The resulting rectified and squared real and "false" edge marker pulses are appropriately designated +E and −E in the signal line designated E.

FIG. 10 illustrates typical coincidence relations that exist as between −E and +E target edge marker pulses and horizontal gate pulse G during automatic operation of the tracking system. As noted therein (FIG. 10(c)), for instance), whenever a +E pulse is singularly coincident with a horizontal tracking gate pulse G, the resulting passed pulse (+M) by triggering one-shot circuit 51 produces a +N pulse of approximately one-line duration; no +M or −N pulses are developed in the same scan-line. Although not shown, in those instances in which a −E pulse only is coincident with horizontal tracking gate pulse G (as during extreme rightward movement of the selected target relative to the sensor viewing axis), a −N tracking error detection pulse is generated within any one video signal horizontal scan-line. In those tracking situations wherein alignment correction is required, a grouping of several consecutive −N or +N pulses will generally exist within an individual field scan. Assuming that the duration of vertical gate pulses J and K are each approximately six scan-lines and assuming that the target essentially extends vertically through the duration of the vertical tracking gates, the resulting groupint may consist of as many as 12 consecutive tracking error detection pulses.

FIG. 11 shows generally similar tracking error detection pulse waveforms +P and −P developed within vertical logic section 21. It should be noted that each part of tracking error detection pulse signal O is essentially passed through either gate 93 or gate 94 if coincident with either a vertical tracking gate pulse K or J, respectively. During proper alignment of the tracking system sensor viewing axis with the selected target in the automatic mode of system operation, −P and +P pulses will occur in sequential groupings of individual pulses. Assuming that the time duration of the gates produced by one-shot circuits 98 and 99 are each approximately six lines and assuming that the tracker unit is detecting one or both of the target edges so as to develop signal O in each scan-line, as many as 12 successive P pulses in two different groupings may occur.

FIG. 12 shows the typical relations which exist as between −N and inverted +N pulses in the FIG. 5 arrangement and within an individual scan-line. When a single edge marker pulse (real or "false") is coincident with the basic horizontal tracking gate pulse G, an N pulse is developed and serves to activate the subsequent circuits 91, 92, and 71 to produce a usable correction signal of proper polarity and magnitude.

FIG. 13 details the typical error correction signals $X_p$ that are developed from intermediate signals Q in response to tracking error detection pulses indicating a system requirement for re-alignment of the sensor viewing axis relative to the selected target. The time periods represented by the FIG. 13(a) and (b) combination and by the FIG. 13(c) and (d) combination are each essentially one vertical scan-time or a total of approximately 525 individual scan-lines in duration. It should be noted from FIG. 13 that a grouping of −N pulses indicating that a relatively rightward-moving target leading edge is coincident with the basic horizontal tracking gate produces negative-going output signals Q and $X_p$ that drives the tracking gate rightwardly away from the coincident target edge and toward the target interior and opposite or trailing edge. Similarly, a grouping of +N pulses (FIG. 13(c)) indicating that a relatively leftward-moving target trailing edge (as manifested by an associated "false" marker pulse) is coincident with the basic horizontal tracking gate produces positive-going output signals Q and $X_p$ that drive the tracking gate leftwardly away from the coincident target edge and toward the target interior and opposite or leading edge.

We claim:

1. In a tracking system tracker unit which develops azimuthal and elevational tracking error correction signals from a television camera sensor video signal, in combination:
   a. First pulse generator circuit means generating, in response to a target edge-like contrast characteristic, detected in the television camera sensor video signal, a pair of marker pulses spaced-apart in a line of scan of the television camera sensor by a time interval,
   b. Second pulse generator circuit means generating an elevational tracking gate pulse having a time duration in a field of scan of the television camera sensor in excess of a line of scan of the television camera sensor for coincidence gating at least one of said pair of marker pulses during concurrent system azimuthal tracking to develop the elevational tracking error correction signal,
   c. Third pulse generator circuit means generating an azimuthal tracking gate pulse having a time duration in a line of scan of the television camera sensor less than said marker pulse spacing time interval for coincidence gating one of said pair of marker pulses on a singularly coincident basis during concurrent system elevational tracking to develop the azimuthal tracking error correction signal,
   d. Fourth pulse generator circuit means generating a pulse extension for said azimuthal tracking gate pulse in a line of scan of the television camera sensor,
   e. AND gate circuit means gating one of said marker pulses coincident in time with said elevational tracking gate pulse and a pulse indicating concurrent system azimuthal tracking as a tracking error detection pulse for developing the elevational tracking error correction signal, and
   f. Circuit means combining said azimuthal tracking gate pulse and said pulse extension into a combination pulse and providing said combination pulse to said AND gate circuit means as said pulse indicating concurrent system azimuthal tracking.

2. The invention defined by claim 1, wherein said pulse extension immediately precedes said azimuthal tracking gate pulse in time in the line of scan of the television camera sensor.

3. The invention defined by claim 1, wherein said pulse extension immediately follows said azimuthal tracking gate pulse in time in the line of scan of the television camera sensor.

4. The invention defined by claim 1, wherein said pulse extension is comprised of two extension portions that immediately precede and immediately follow said azimuthal tracking gate pulse in time in the line of scan of the television camera sensor.

5. The invention defined by claim 1, wherein said pulse extension has a time duration in the line of scan of the television camera sensor substantially not less than the time duration of one of said marker pulses.

6. The invention defined by claim 4, wherein said two extension portions comprising said pulse extension each have a time duration in the line of scan of the television camera sensor substantially not less than the time duration of either of said marker pulses.

7. In a method of developing azimuthal and elevational tracking error correction signals from a television camera sensor video signal, the steps of:
- a. Generating, in response to a target edge-like contrast characteristic detected in the television camera sensor video signal, a pair of marker pulses spaced-apart in a line of scan of the television camera sensor by a time interval,
- b. Generating an elevational tracking gate pulse having a time duration in a field of scan of the television camera sensor in excess of a line of scan of the television camera sensor for coincidence gating at least one of said pair of marker pulses during concurrent system azimuthal tracking to develop the elevational tracking error correction signal,
- c. Generating an azimuthal tracking gate pulse having a time duration in a line of scan of the television camera sensor less than said marker pulse spacing time interval for coincidence gating said pair of marker pulses on a singularly coincident basis during concurrent system elevational tracking to develop the azimuthal tracking error correction signal,
- d. Generating a pulse extension for said azimuthal tracking gate pulse in a line of scan of the television camera sensor, and
- e. Gating one of said marker pulses coincident in time with said elevational tracking gate pulse and with a time comprised of the time duration of said azimuthal tracking gate pulse and the time duration of said pulse extension as a tracking error detection pulse for developing the elevational tracking error correction signal.

8. The invention defined by claim 7, wherein said pulse extension is generated immediately before said azimuthal tracking gate pulse.

9. The invention defined by claim 7, wherein said pulse extension is generated immediately following said azimuthal tracking gate pulse.

10. The invention defined by claim 7, wherein said pulse extension is generated in two pulse portions, one of which immediately precedes said azimuthal tracking gate pulse and the other of which immediately follows said azimuthal tracking gate pulse.

11. The invention defined by claim 7, wherein said pulse extension has a time duration in the line of scan of the television camera sensor substantially not less than the time duration of one of said marker pulses.

12. The invention defined by claim 10, wherein each of said two pulse portions comprising said pulse extension is generated with a time duration in the line of scan of the television camera sensor substantially not less than the time duration of either of said marker pulses.

* * * * *